(12) United States Patent
Huynh (10) Patent No.: US 8,593,830 B2
(45) Date of Patent: Nov. 26, 2013

(54) REVERSE CURRENT LIMIT PROTECTION FOR ACTIVE CLAMP CONVERTERS

(75) Inventor: Thong Anthony Huynh, Fremont, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 246 days.

(21) Appl. No.: 13/164,689

(22) Filed: Jun. 20, 2011

(65) Prior Publication Data

US 2011/0317451 A1 Dec. 29, 2011

Related U.S. Application Data

(60) Provisional application No. 61/359,752, filed on Jun. 29, 2010.

(51) Int. Cl.
*H02M 3/335* (2006.01)

(52) U.S. Cl.
USPC ..................... 363/21.01; 363/21.04

(58) Field of Classification Search
USPC ................. 363/21.01, 21.04, 21.12
See application file for complete search history.

(56) References Cited

U.S. PATENT DOCUMENTS

| | | | |
|---|---|---|---|
| 4,241,313 A | 12/1980 | Takehara | 330/253 |
| 4,456,887 A | 6/1984 | Tokumo | 330/261 |
| 4,780,625 A | 10/1988 | Zobel | 307/350 |
| 4,820,997 A | 4/1989 | Sano et al. | 330/252 |
| 5,122,759 A | 6/1992 | Nodar | 330/252 |
| 5,126,931 A * | 6/1992 | Jitaru | 363/21.04 |
| 5,151,852 A | 9/1992 | Jacobson et al. | 363/131 |
| 5,280,235 A | 1/1994 | Neale et al. | 323/314 |
| 5,289,137 A | 2/1994 | Nodar et al. | 330/296 |
| 5,412,309 A | 5/1995 | Ueunten | 323/316 |
| 5,422,600 A | 6/1995 | Petty et al. | 330/257 |
| 5,455,523 A | 10/1995 | Wallace et al. | 326/30 |
| 5,469,106 A | 11/1995 | Dow | 330/254 |
| 5,490,052 A * | 2/1996 | Yoshida et al. | 363/15 |
| 5,563,526 A | 10/1996 | Hastings et al. | 326/37 |
| 5,625,278 A | 4/1997 | Thiel et al. | 323/280 |

(Continued)

FOREIGN PATENT DOCUMENTS

| | | |
|---|---|---|
| EP | 0651500 A1 | 3/1995 |
| JP | 61-079310 | 4/1986 |

(Continued)

OTHER PUBLICATIONS

Final Office Action dated Dec. 29, 2011, U.S. Appl. No. 12/206,631, filed Sep. 8, 2008, Tony Doy.

(Continued)

*Primary Examiner* — Adolf Berhane
*Assistant Examiner* — Emily P Pham (57) ABSTRACT

DC-to-DC converters are protected from damage by, among other things, monitoring and controlling forward and reverse currents in their transformer primary windings. The currents are discontinued if their values fall outside a predetermined range or if they flow during a portion of the switching cycle in a manner that would result in cross-conduction. Power switches in these converters are also protected from damage by adjusting the maximum duty cycles of these converters to vary with their input voltages. In this way, the maximum voltage across the power switches is kept within a relatively narrow range. These protective features can be combined in any number of ways to fit the application at hand.

28 Claims, 10 Drawing Sheets

(56) References Cited

U.S. PATENT DOCUMENTS

| | | | |
|---|---|---|---|
| 5,666,355 A | 9/1997 | Huah et al. | 370/311 |
| 5,760,652 A | 6/1998 | Maemura et al. | 330/297 |
| 6,011,440 A | 1/2000 | Bell et al. | 330/297 |
| 6,061,253 A * | 5/2000 | Igarashi et al. | 363/19 |
| 6,163,216 A | 12/2000 | Murray et al. | 330/255 |
| 6,178,247 B1 | 1/2001 | Ogita | 381/74 |
| 6,297,624 B1 | 10/2001 | Mitsui et al. | 323/316 |
| 6,466,461 B2 * | 10/2002 | Mao et al. | 363/21.08 |
| 6,472,935 B2 | 10/2002 | King et al. | 330/51 |
| 6,489,848 B2 | 12/2002 | Smith et al. | |
| 6,512,411 B2 | 1/2003 | Meng et al. | 327/536 |
| 6,636,103 B2 | 10/2003 | Wurcer et al. | |
| 7,061,327 B2 | 6/2006 | Doy | 330/297 |
| 7,061,328 B2 | 6/2006 | Doy | 330/297 |
| 7,167,569 B1 | 1/2007 | Seven | |
| 7,183,857 B2 | 2/2007 | Doy et al. | 330/297 |
| 7,187,149 B1 * | 3/2007 | Balog et al. | 318/434 |
| 7,495,515 B1 | 2/2009 | Branch et al. | 330/305 |
| 7,714,661 B2 | 5/2010 | Doy et al. | 330/297 |
| 2002/0008584 A1 | 1/2002 | Manjrekar et al. | 330/296 |
| 2002/0186490 A1 | 12/2002 | Jiang et al. | 360/60 |
| 2003/0039128 A1 * | 2/2003 | Cohen | 363/20 |
| 2003/0138112 A1 | 7/2003 | Doy | 381/74 |
| 2005/0184807 A1 | 8/2005 | Doy et al. | 330/297 |
| 2007/0249304 A1 | 10/2007 | Snelgrove et al. | 455/127.2 |
| 2008/0136342 A1 * | 6/2008 | Tamegai et al. | 315/209 R |
| 2010/0259231 A1 | 10/2010 | McCune, Jr. | 323/225 |

FOREIGN PATENT DOCUMENTS

| | | |
|---|---|---|
| JP | 01-117423 | 5/1989 |
| JP | 01-280911 | 11/1989 |
| JP | 04-072902 | 3/1992 |
| JP | 05-226940 | 9/1993 |
| JP | 05-347519 | 12/1993 |
| JP | 06-188660 | 7/1994 |
| JP | 07-184370 | 7/1995 |
| JP | 01-508610 | 6/2001 |
| JP | 02-092802 | 3/2002 |
| JP | 03-087061 | 3/2003 |
| JP | 04-135016 | 4/2004 |
| WO | WO 97/43825 | 11/1997 |
| WO | WO 98/42072 | 9/1998 |
| WO | WO 00/33460 | 6/2000 |

OTHER PUBLICATIONS

Huang, Sun-Kim, *Electronic Circuit Overview* (textbook), May 1980, pp. 174 and 175 (no English translation available).

*Dual μPower JFET-Input Operational Amplifier with Switched-Capacitor Voltage Converter*, Texas Instruments Inc. pp. 1-38, (1994).

*80mW, DirectDrive Stereo Headphone Driver with Shutdown*, Maxim Integrated Products, pp. 1-20, Oct. 2002.

*80mW, Fixed-Gain, DirectDrive, Stereo Headphone Amplifier with Shutdown*, Maxim Integrated Products, pp. 1-18, Apr. 2003.

*Ground-Referenced, 85mW Stereo Headphone Amplifier*, National Semiconductor, pp. 1-16, Aug. 2004.

*Dual μPower JFET-Input Operational Amplifier with Switched-Capacitor Voltage Converter*, Texas Instruments, Inc. Addendum p. 1-2, Mar. 30, 2005.

*Ground-Referenced, Ultra Low Noise, Fixed Gain, 80mW Stereo Headphone Amplifier*, National Semiconductor, pp. 1-22, Jun. 2005.

*80-mW Cap-Free Stereo Headphone Driver*, Texas Instruments Inc., pp. 1-22, Aug. 2004, revised Aug. 2005.

*80-mW Cap-Free Stereo Headphone Driver*, Texas Instruments Inc., Addendum pp. 1-4, Aug. 25, 2005.

LT1007/FT1037, *Low Noise, High Speed Precision Operational Amplifiers*, Linear Technology Corporation, USA, 1989.

Dalai, Dhaval, *Design Considerations for Active Clamp and Reset Technique*, Texas Instruments Inc., pp. 1-24, 2001.

Acik, Adnan and Isik Cadirci, *Active Clamped ZVS Forward Converter With Soft-Switched Synchronous Rectifier*, METU Electrical and Electronics Engineering Department, Ankara-Turkey, Turk J Elec Engin, vol. 10, No. 3, pp. 473-491, 2002.

Non-Final Office Action dated Oct. 3, 2011, U.S. Appl. No. 12/206,631, filed Sep. 8, 2008, Tony Doy.

* cited by examiner

REVERSE CURRENT LIMIT PROTECTION FOR ACTIVE CLAMP CONVERTERS

CROSS-REFERENCE TO RELATED APPLICATION

This application claims priority under 35 U.S.C. §119(e) of the U.S. provisional patent application Ser. No. 61/359,752, filed Jun. 29, 2010, and titled "Reverse Current Limit Protection for Active Clamp Converter," which is hereby incorporated by reference.

FIELD OF THE INVENTION

The present invention relates to power electronics. More specifically, the present invention relates to DC-to-DC converters.

BACKGROUND OF THE INVENTION

Forward converters with active-clamp reset offer multiple benefits to designers and are presently finding wide use. Power converters based on the forward topology are particularly useful in applications where high efficiency and good power handling capability are required, mostly in the 50 W to 500 W output power range. While the popularity of the forward topology is based upon many factors, designers have primarily been drawn to its simplicity, performance, and efficiency. The forward converter is derived from the buck topology, however the transformer employed in the forward topology provides input-output ground isolation as well as a step-down or step-up function. The transformer in a forward topology does not inherently reset each switching cycle as do symmetrical topologies. A number of different reset mechanisms have been employed in forward power converters, each method having its own benefits and challenges.

Figure 1A:
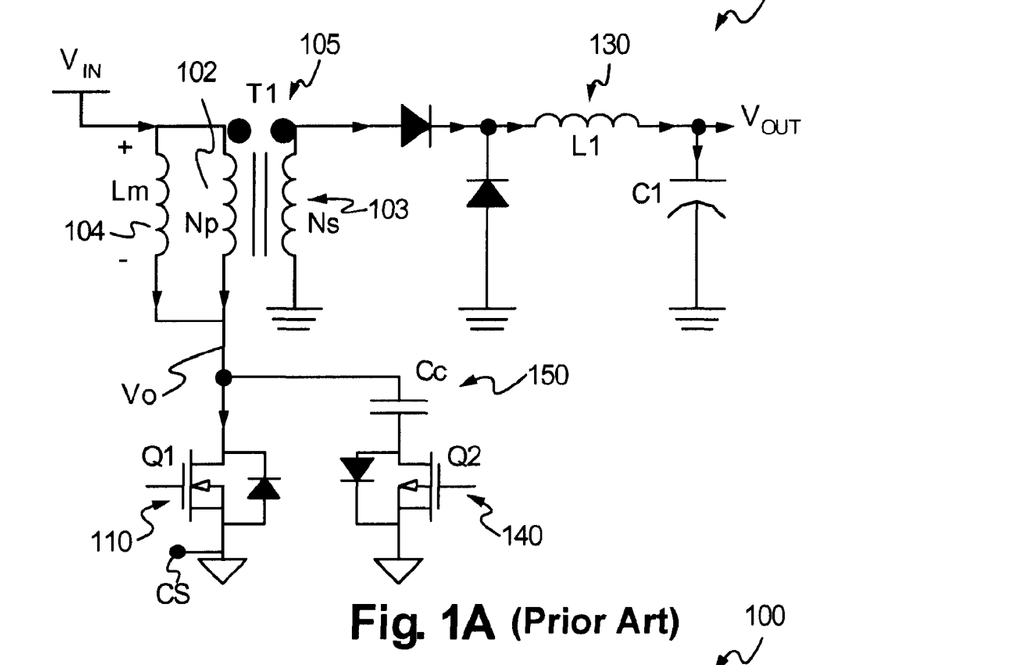
FIGS. 1A-C show a prior art DC-to-DC converter in operation at different phases of consecutive switching cycles.
Figure 1B:
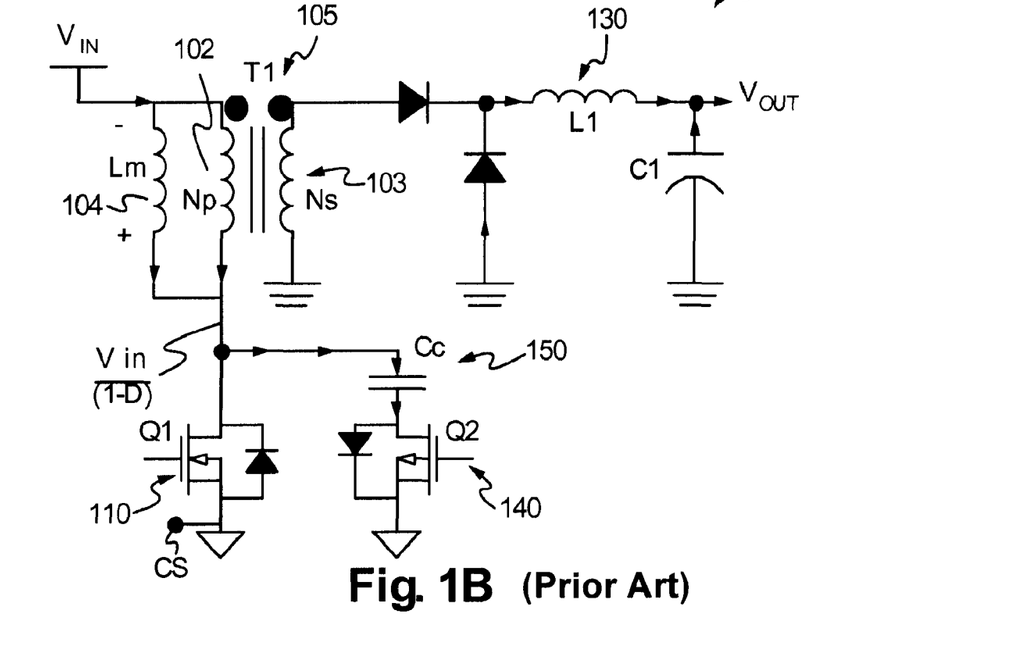
Figure 1C:
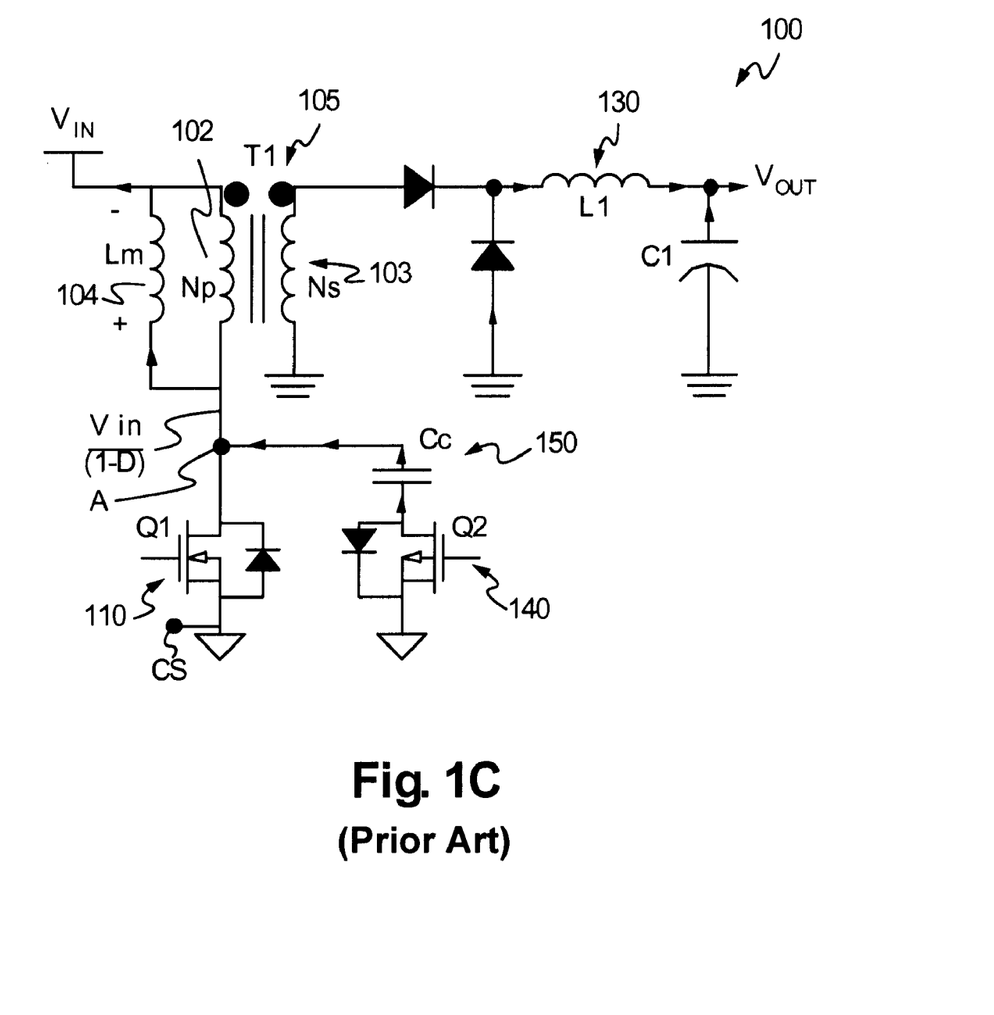

FIGS. 1A-C illustrate the main operational steps of an active clamp forward power converter 100. FIG. 1A shows the active clamp forward power converter 100 at a time $t_0$. At time $t_0$, the main power switch Q1 110 is ON, applying the input voltage $V_{IN}$ across the primary winding 102 of the transformer 105. The resulting voltage at the secondary winding 103 of the transformer 105 is calculated as $V_{IN}(N_S/N_P)$, where $N_P$ and $N_S$ are the number of turns in the primary winding 102 and secondary winding 103, respectively. The primary current has two components at this time: the reflected current from the output inductor L1 130 represented as $I_L (N_S/N_P)$ and the current ramping up in the magnetizing inductance $L_m$ 104. The reset switch Q2 140 is OPEN and the clamp capacitor $C_C$ 150 has been previously charged to a voltage of $V_{IN}/(1-D)$ in volts. This interval is the power phase, during which energy is transferred from the primary winding 102 to the secondary winding 103. The approximate duration of the power phase is $T_S (N_P/N_S)(V_{OUT}/V_{IN})$, where $T_S$ is the switching period.

FIG. 1B shows the power converter 100 at a time $t_1$, later than $t_0$. At time $t_1$, the main power switch Q1 110 is turned OFF and the reset switch Q2 140 is turned ON. The time $t_1$ is generally known as the reset phase, because turning ON the reset switch Q2 140 resets the flux within the primary winding 102. The magnetizing current flows through the clamp capacitor $C_C$ 150 and the reset switch Q2 140 instead of through the main power switch Q1 110. Since the clamp capacitor $C_C$ 150 voltage is greater than $V_{IN}$, the voltage across the primary winding 102 is now reversed with respect to the power phase $t_0$. Because the potential across the magnetizing inductance $L_m$ 104 has been reversed, the magnitude of the magnetizing current will decrease as the energy stored in the magnetizing inductance $L_m$ 104 is transferred into the clamp capacitor $C_C$ 150. The voltage across the clamp capacitor $C_C$ 150 increases slightly during this period and peaks when the magnetizing current reaches zero.

FIG. 1C shows the power converter 100 at time $t_2$, later than $t_1$. At time $t_2$, the current in the magnetizing inductance $L_m$ 104 reaches zero and starts to build in the opposite direction. The current is sourced from the clamp capacitor $C_C$ 150 through the reset switch Q2 140 and travels through the magnetizing inductance $L_m$ 104 and then back to the source ($V_{IN}$). The current will continue to build in the opposite direction as the clamp capacitor $C_C$ 150 returns the energy that it had previously captured from the magnetizing inductance $L_m$ 104. This is known as "reverse current" since current is being sourced back into $V_{IN}$. Excessive reverse current may cause saturation of the transformer 105, leading to catastrophic failure of the power converter 100 and therefore should be contained to a manageable level. Steady state conditions require the clamp capacitor $C_C$ 150 voltage to return to the starting potential and the magnetizing current at the conclusion of the reset time to reach the same magnitude and opposite polarity as the current at the beginning of this reset time. At the conclusion of $t_2$, the switching period is over, as defined by the controller oscillator period being over. The flux within the transformer 105 will naturally be balanced, as represented by the equation $V_{ON}(D*T_S)=V_{OFF}(1-D)T_S$, where D is the duty cycle of the clock signal controlling the main power switch Q1 110. $V_{OFF}$ is the voltage that becomes applied across the primary winding 102 when there is no drive signal applied to Q1 110.

The voltage the clamp capacitor $C_C$ 150 measured at the bottom of the primary winding 102 drops below 0 during the OFF time of the duty cycle, calculated as $(1-D)T_S$, as a result of the voltage stored in the clamp capacitor $C_C$ 150. The voltage is positive at the node A of FIG. 1C during the time at which Q1 110 is OFF and Q2 140 is ON. The voltage is represented as $V_{DS}=V_{IN}/(1-D)$. Because $V_{IN}=(N_P/N_S)(1/D)V_{OUT}$, or $V_{IN}=K/D$ where K is a defined constant ($N_P/N_S$) $V_{OUT}$, then $V_{DS}=V_{IN}/(1-(K/V_{IN}))$.

As can be seen, $V_{DS}$ is a function of either $V_{IN}$ and D, or $V_{IN}$ and K. D should not approach one, or $V_{DS}$ will increase to a point where Q1 110 may be destroyed. Therefore, the voltage across $C_C$ 150 during time $t_2$ is also impressed across the drain-source of Q1 110. As a result, an appropriate transistor must be selected to handle this voltage. However, as is known, a transistor having a larger $V_{DS}$ rating, meaning it can handle higher potentials across its drain-source, is physically bigger, more expensive, and less efficient. It is desirable to keep that voltage at the time $t_2$ as low as possible so as to be able to make Q1 110 as small as possible, thereby making Q1 less expensive, more efficient and, in terms of form factor, more desirable.

Figure 2:
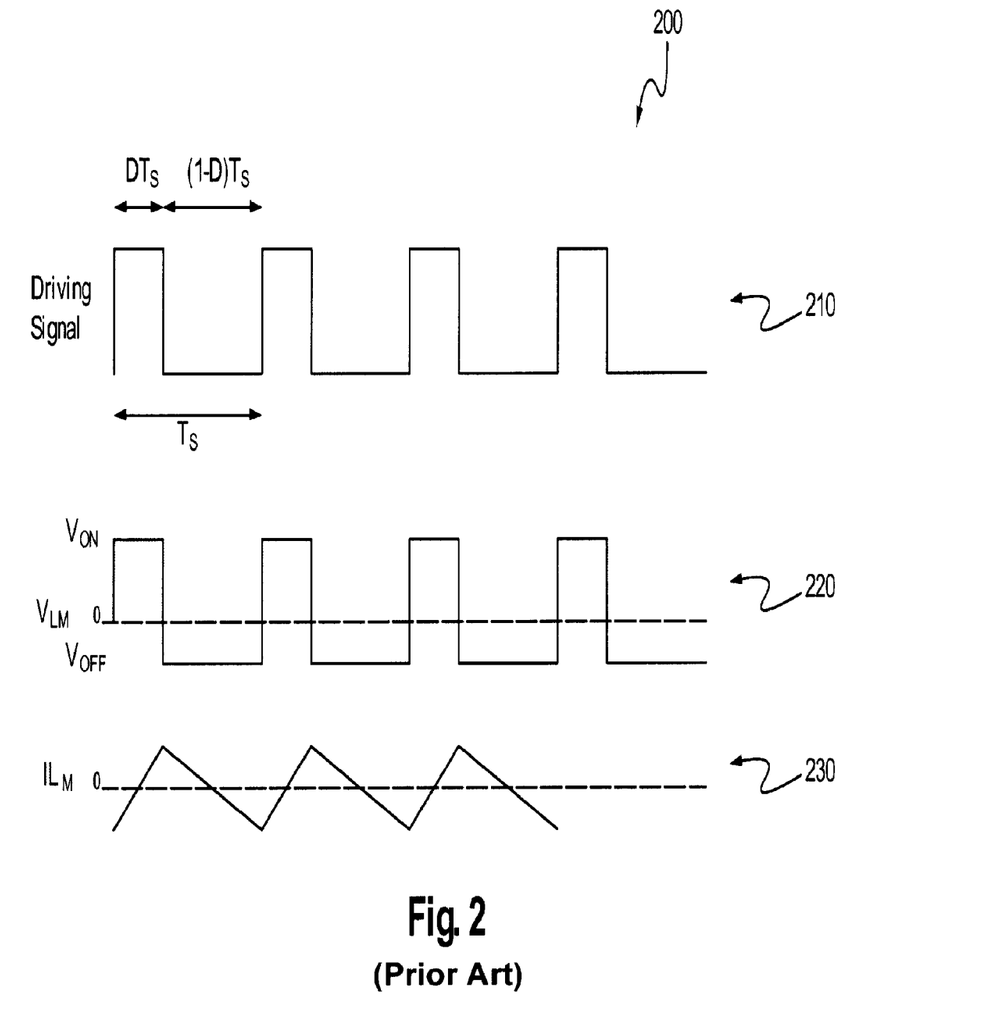
FIG. 2 shows graphs illustrating operation of the DC-to-DC converter of FIG. 1A during steady state conditions.

FIG. 2 shows graphs 200 of driving signals 210, 220, 230 used to operate an active clamp forward converter such as the converter 100 of FIGS. 1A-C. The driving signal 210 is the signal applied to the main power switch Q1 110 and reset or auxiliary switch Q2 140 of the power converter 100 of FIGS. 1A-C. The ON time $DT_S$ is when Q1 110 is driven ON and Q2 140 is driven OFF. The opposite is true for the time $(1-D)T_S$. The ratio between the time $DT_S$ and $T_S$ is known as the duty cycle, D, and $T_S$ is the commonly known switching time where $1/T_S$ is the switching frequency. $V_{LM}$ 220, the voltage across $L_m$ 104, oscillates between $V_{ON}$, during the ON time $DT_S$, and $V_{OFF}$, during the OFF time $(1-D)T_S$. There is a short dead time from the time Q1 110 turns OFF until Q2 140 turns ON and vice versa. This dead time affects the duty cycle D only slightly. For simplicity, this dead time is not shown in FIG. 2 and is not accounted for in this disclosure. Finally, $IL_M$ 230, the magnetizing current, represents the current through the magnetizing inductance $L_m$ 104 during the various stages of the switching cycle $T_S$. It is referenced as positive when flowing from the voltage source such as $V_{IN}$ to $L_m$ and negative when flowing into $V_{IN}$ from $L_m$.

Figure 3A:
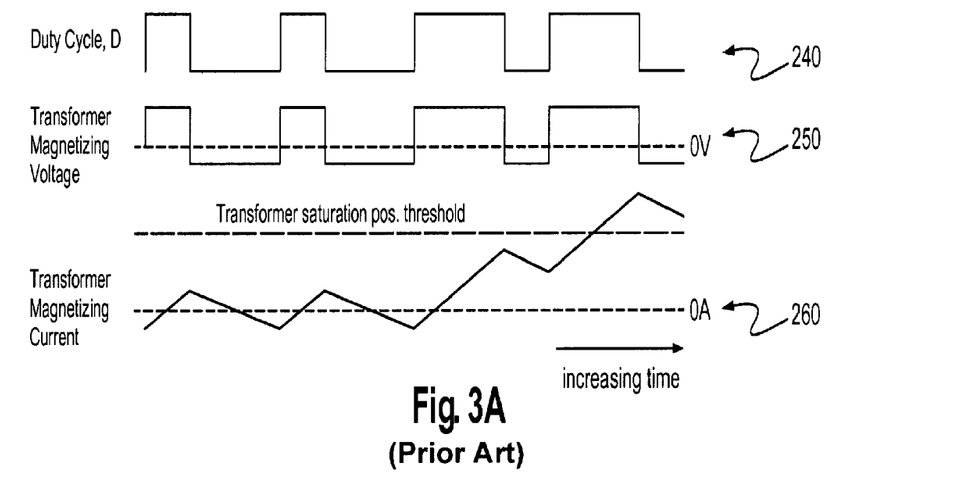
FIGS. 3A and 3B show graphs illustrating operation of the DC-to-DC converter of FIG. 1A in response to changes in a load transient.

FIG. 3A illustrates how the transformer 100 suffers flux imbalance during a low-to-high transient. FIG. 3A shows a graph 240 of a duty cycle D of the transformer 100 versus time, a graph 250 of a corresponding transformer magnetizing voltage versus time, and a graph 260 of a corresponding transformer magnetizing current versus time, with the horizontal axes of all the graphs 240, 250, and 260 aligned. As shown in FIG. 3A, as the duty cycle D increases rapidly in response to a transient condition, such as a low-to-high load transient, the duration of the positive segment of the transformer magnetizing voltage increases, and the transformer magnetizing current steadily increases. This results in a positive flux imbalance in the magnetizing inductance $L_m$ 104.

Figure 3B:
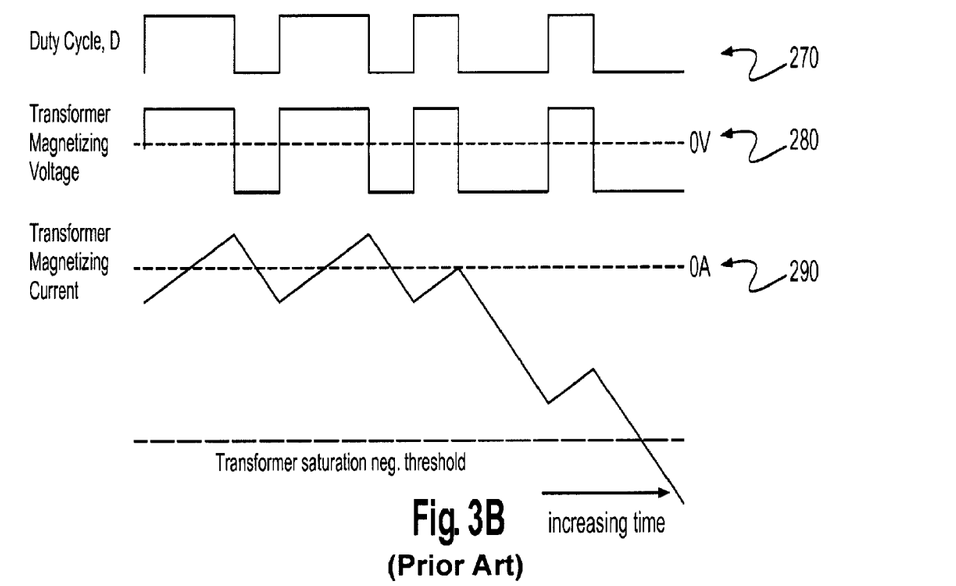

FIG. 3B illustrates how the transformer 100 suffers flux imbalance during a high-to-low transient. FIG. 3B shows a graph 270 of a duty cycle D of the transformer 100 versus time, a graph 280 of a corresponding transformer magnetizing voltage versus time, and a graph 290 of a corresponding transformer magnetizing current versus time, with the horizontal axes of all the graphs 270, 280, and 290 aligned. As shown in FIG. 3B, as the duty cycle D decreases rapidly in response to a transient condition, such as a high-to-low load transient, the duration of the positive segment of the transformer magnetizing voltage decreases, and the transformer magnetizing current steadily decreases. This results in a negative flux imbalance in the magnetizing inductance $L_m$ 104.

As shown in FIGS. 3A and 3B, both steadily increasing and steadily decreasing transformer magnetizing currents lead to saturation of the magnetizing inductance $L_m$ 104 and, ultimately, catastrophic failure of the transformer 105 and/or other components connected to it.

BRIEF SUMMARY OF THE INVENTION

In accordance with principles of the invention, DC-to-DC converters are protected from internal damage by monitoring and controlling currents that flow through them. Damage can result from excessive currents, from shorts generated by cross conduction, and from excessive voltages across power switches and other components. Both positive and negative currents flowing within the converters are monitored so that appropriate action can be taken before any catastrophic damage occurs. In this way, DC-to-DC converters employing principles of the invention are less susceptible to these and other damage.

In a first aspect of the invention, a DC-to-DC converter includes a transformer, a sensing element, and a controller that controls currents during switching cycles of the DC-to-DC converter. The transformer has a primary winding coupled to a forward current path and a reverse current path. The forward current path sources a forward current, from a top of the primary winding to a bottom of the primary winding during a power phase of a switching cycle. The reverse current path sources a reverse current, from the bottom of the primary winding to the top of the primary winding during a reset phase of the switching cycle. The sensing element senses the forward and reverse currents, and the controller controls these currents based on their sensed values.

In one embodiment, the controller discontinues the forward current during a remainder of the power phase if the forward current is above a predetermined first threshold and discontinues the reverse current during a remainder of the reset phase if the reverse current is below a predetermined second threshold. The DC-to-DC converter includes a power switch on the forward current path and a reset switch on the reverse current path, such that the controller automatically turns OFF the power switch when the forward current is above the predetermined first threshold and turns OFF the reset switch when the reverse current is below the predetermined second threshold.

In one embodiment, the controller controls the power switch and the reset switch to automatically adjust a duty cycle of the DC-to-DC converter to maintain a voltage across the power switch within a predetermined range. The controller uses an input voltage to the DC-to-DC converter to determine a maximum duty cycle.

In another embodiment, the controller turns ON the power switch only if a magnetizing current through the primary winding is a reverse current, and turns ON the reset switch only if the magnetizing current is a forward current.

The sensing element includes a sense resistor coupling the forward and reverse current paths to a common potential, such as ground. The controller monitors voltages or currents across the sense resistor to determine the value and direction of current flows. Alternatively, the sensing element includes first and second sense resistors coupling the forward and reverse current paths, respectively, to the common potential.

In a second aspect of the invention, a method of controlling current flow in a DC-to-DC converter that has a transformer with a primary winding includes sensing positive currents, in a forward current path, and sensing negative currents, in a reverse current path. The method includes automatically adjusting the positive and negative currents during a switching cycle of the DC-to-DC converter. As one example, the positive and negative currents are adjusted by adjusting duty cycles of the DC-to-DC converter using pulse width modulation. Preferably, the forward current path contains a power switch, and a voltage across the power switch is inversely proportional to $D*(1-D)$, where D is a duty cycle of the DC-to-DC converter.

In a third aspect of the invention, a controller for monitoring and adjusting currents during a switching cycle of a DC-to-DC converter includes a processor that executes a state machine having at least first, second, and third states. The first state corresponds to a first current having a positive polarity (corresponding to current flowing in a positive direction) and a second current having a substantially zero value during a first phase of the switching cycle. The second state corresponds to the first current having a substantially zero value and the second current having a negative polarity during a second phase of the switching cycle. The third state corresponds to the first and second currents both having substantially zero values during remainders of the switching cycle. The relative durations of the first and second states during the switching cycle define a variable duty cycle. Transitions between the first and second states are based on values and polarities of the first and second currents, on values of an input voltage to the DC-to-DC converter, or on some combination of these elements.

DETAILED DESCRIPTION OF THE DRAWINGS

In accordance with principles of the invention, DC-to-DC power converters are protected from damage by, among other things, preventing currents in their transformer windings from reaching unacceptable levels, by preventing voltages across their power switches from exceeding predetermined limits, and by preventing short circuits. These DC-to-DC power converters prevent these failures by monitoring and adjusting both forward and reverse currents. These converters use smaller, more reliable, and less expensive power switches, are more robust, and are able to be used in a wider range of applications.

Figure 4:
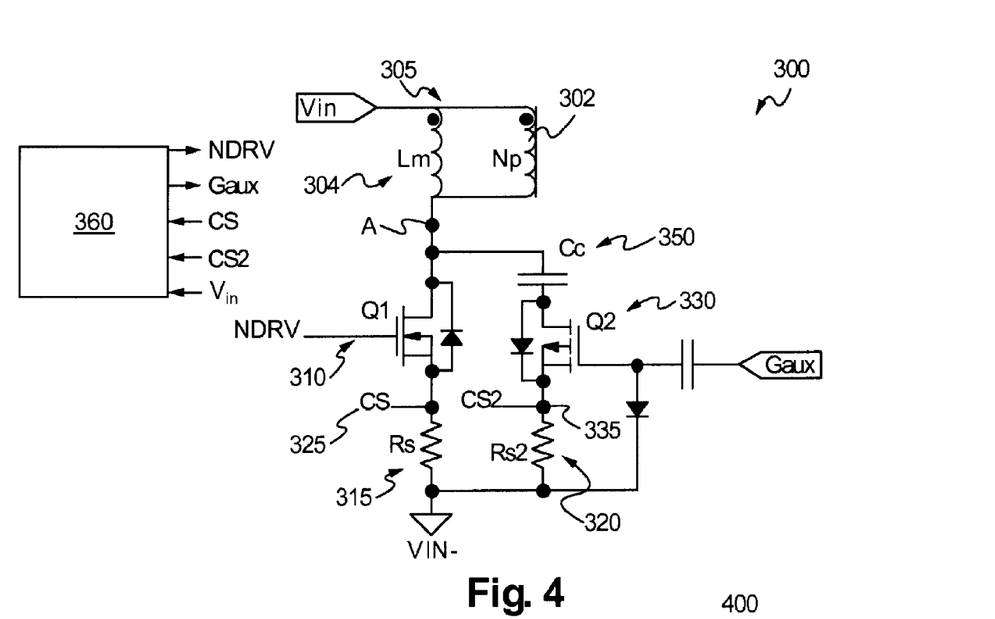
FIGS. 4 and 5 show DC-to-DC converters in accordance with different embodiments of the invention.

FIG. 4 shows an active clamp forward converter 300 in accordance with one embodiment of the invention. As discussed above, prior art solutions measure the current of the circuit branch having the main power switch, such as Q1 110 of FIGS. 1A-C. Stated differently, only the current flowing from the transformer 105 to ground is measured, and the main power switch Q1 110 is turned OFF based only upon the positive current flow. Embodiments of the invention provide a more robust current-sensing scheme. Referring again to FIG. 4, the converter 300 detects a reverse current flowing back into the transformer 305 and appropriately turns OFF the auxiliary (reset) switch Q2 330 according to the reverse current, defined as the current flowing from ground through Q2 330 and $C_C$ 350 to the magnetizing inductance $L_m$ 304 of the transformer 305. As the reverse current increases, both Q1 310 and Q2 330 are disabled or turned OFF. As a result, the node A appears as a tri-state switch to the transformer 305. This action stops the reverse magnetization current from building up any further, thus preventing reverse saturation in the magnetizing inductance $L_m$ 304. Preferably, while Q1 310 and Q2 330 are able to be driven OFF at the same time, they are not driven ON at the same time.

The converter 300 has two current-sensing points CS 325 and CS2 335, each having a current sensing resistor. The current flowing from the transformer 305 through the sense resistor RS 315 is measured at the point CS 325. The measurement can, for example, be of the voltage across RS 315. The reverse current flowing from ground up through Q2 330 is measured at the point CS2 335 as the voltage across RS2 320.

A controller 360 receives the sensed current data from nodes CS 325 and CS2 335 and generates the driving signals $N_{DRV}$ and $G_{AUX}$ to control Q1 310 and Q2 330, such as by turning one ON and the other OFF or by turning both OFF. The controller 360 is coupled to an oscillator or some other means (not shown) for generating a clock signal and thus the switching cycle. The driving signals $N_{DRV}$ and $G_{AUX}$ control Q1 310 and Q2 330, respectively, according to both the forward current measured at the node CS 325 and the reverse current measured at the node CS2 335. As mentioned above, as the reverse current increases, thereby causing the voltage at node CS2 335 to go more negative, Q2 330 can be turned OFF independently, thereby forming a tri-state condition at Node A.

It will be appreciated that currents can be measured using voltage measurements and resistor values or by using current measurements directly. It will also be appreciated that when the bottom end of the resistors RS 315 and RS2 320 are grounded, some of the measured voltages and currents are negative.

Figure 5:
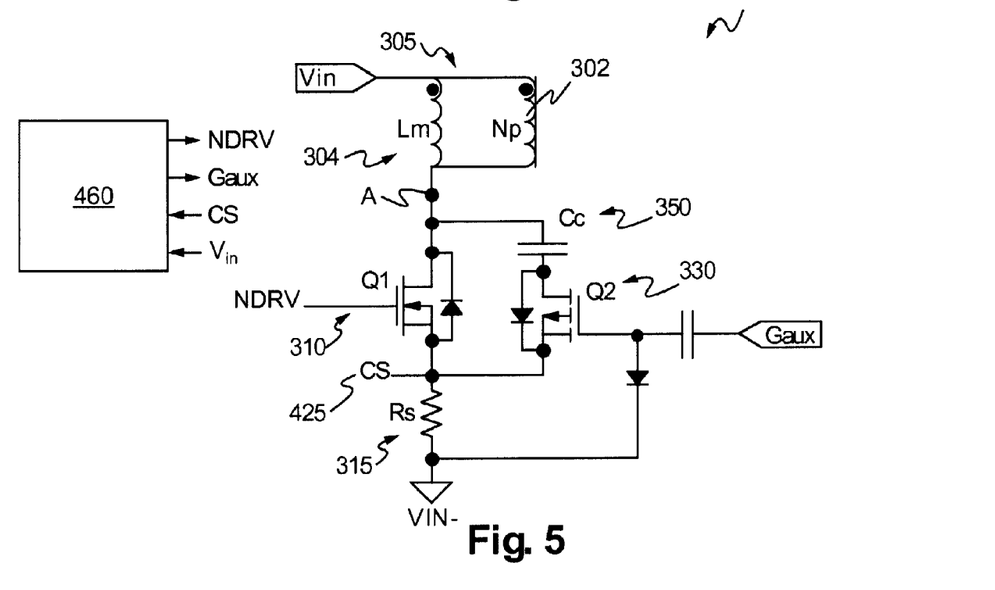

FIG. 5 shows a system for determining the reverse current in accordance with another embodiment of the invention. As in all the figures, the same label refers to the same or a similar element. Here, the node CS 425 is electrically coupled to both Q1 310 and Q2 330. As a result, the voltage across the sense resistor RS 315 will form as a result of the difference of the currents in the two branches. If the voltage at the point CS 425 drops below a negative threshold, indicating a large reverse magnetizing current, then Q2 330 can be disabled or turned OFF for the rest of the switching cycle. This action stops the reverse magnetizing current from building up further, thus preventing reverse saturation in the magnetizing inductance $L_m$ 304 of the transformer 305. Similar to the operation of the controller 360, the controller 460 receives the voltage generated at the point CS 425 and generates the control signals $N_{DRV}$ and $G_{AUX}$.

Figure 6:
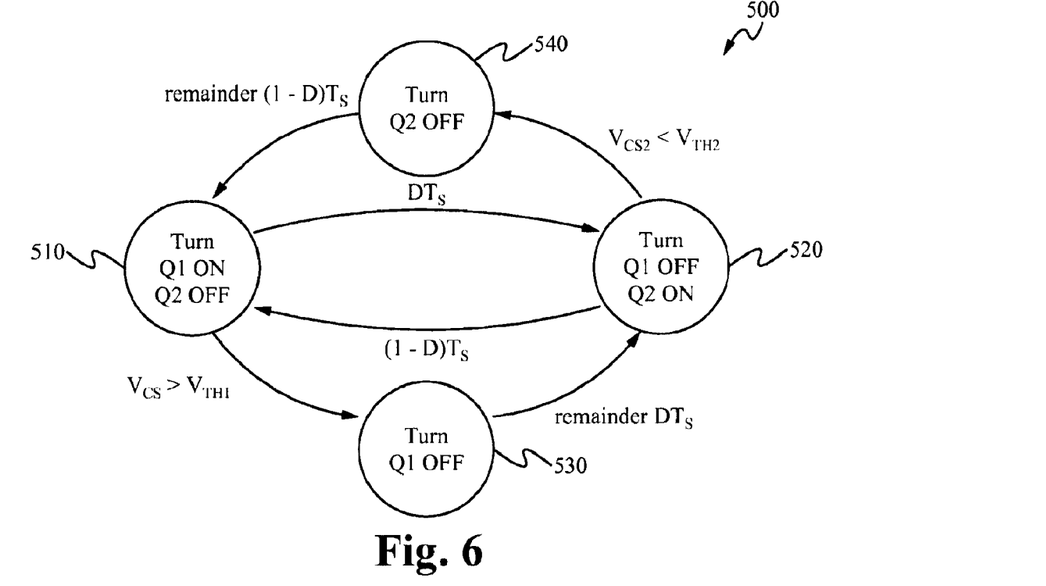
FIGS. 6 and 7 show state machine diagrams for a controller in a DC-to-DC converter in accordance with embodiments of the invention.

FIG. 6 shows a state diagram 500 for the controller 360 in accordance with one embodiment of the invention. Referring to FIGS. 4 and 6, in the state 510, Q1 310 is ON and Q2 330 is OFF. If, during the interval $DT_S$, the voltage measured at the node CS 325 ($V_{CS}$) does not exceed a predetermined positive threshold ($V_{TH1}$), the state 520 is entered, in which Q1 310 is turned OFF and Q2 330 is turned ON. If, during the interval $DT_S$, the voltage $V_{CS}$ does exceed $V_{TH1}$, the state 530 is entered, in which Q1 is turned OFF. In the state 530, after the remainder of the time $DT_S$ has elapsed, the state 520 is entered.

While in the state 520, if during the interval $(1-D)T_S$ the voltage at the node CS2 ($V_{CS2}$) does not fall below a predetermined negative threshold ($V_{TH2}$), state 510 is entered. If during the interval $(1-D)T_S$ $V_{CS2}$ falls below $V_{TH2}$, the state 540 is entered. In the state 540, Q2 330 is turned OFF and, after the remainder of the interval $(1-D)T_S$ has elapsed, the state 510 is entered.

As one example, $V_{TH1}$ is slightly less than the value corresponding to the saturation current of the transformer, and $V_{TH2}$ equals $-V_{TH1}$. In general, $V_{THX}$ is set depending on scale factors such as $R_S$ (e.g., FIG. 5) and the peak magnetizing current allowed in the transformer before the transformer core saturates, a value that depends on the particular transformer design. In one non-limiting application, $V_{THX}$ is in the range of approximately 0.1V to 2V. Those skilled in the art will recognize other possible values for $V_{TH1}$ and $V_{TH2}$, depending on the application at hand.

As for all the state diagrams relating to the controller 360, the controller 460 in FIG. 5 will execute a state diagram based on measurements at the node CS 425.

In accordance with other embodiments, cross conduction between the main power switch Q1 and the auxiliary switch Q2 is reduced or eliminated. FIG. 2 shows the proper steady state magnetizing current in graphical form with respect to the driving signal of the main power switch Q1 310 and the auxiliary switch Q2 330 for the converter 300 of FIG. 4. In steady state operation when the flux is balanced, during the dead time when both Q1 310 and Q2 330 are OFF, and before Q1 310 turns ON, the magnetizing current, $L_m$, is flowing in the reverse direction, from ground through the body diode of Q1 330 to Node A, through $L_m$ and back to $V_{IN}$. When the flux is not balanced, $L_m$ flows through the body diode of Q2 330 to ground, thereby turning ON the body diode of Q2 330. When a diode is turned ON, it will take some time, known as "diode recovery time," for the diode to turn OFF. During this time, if Q1 310 is turned ON, a short can form in the circuit branch having Q2 330, $C_C$ 350 and Q1 310. This is called "cross conduction," an undesirable occurrence that may cause permanent damage to the circuit. Similarly, at another instance, when both Q1 310 and Q2 330 are OFF, if the current is still flowing in the reverse direction through the body diode of Q1 310, a short condition can be caused in that branch as soon as Q2 320 turns ON. Again, by sensing the currents at the nodes CS 325 and CS2 335, the processor 360 can determine whether to turn ON the appropriate one of the switches Q1 310 and Q2 330 to avoid excessive cross conduction. It should be noted that a person of ordinary skill having the benefit of this disclosure will readily appreciate several well known methods of sensing current, including but not limited to sensing the voltage across the switches Q1 310 and Q2 330, using a current sense transformer, or using similar means.

Figure 7:
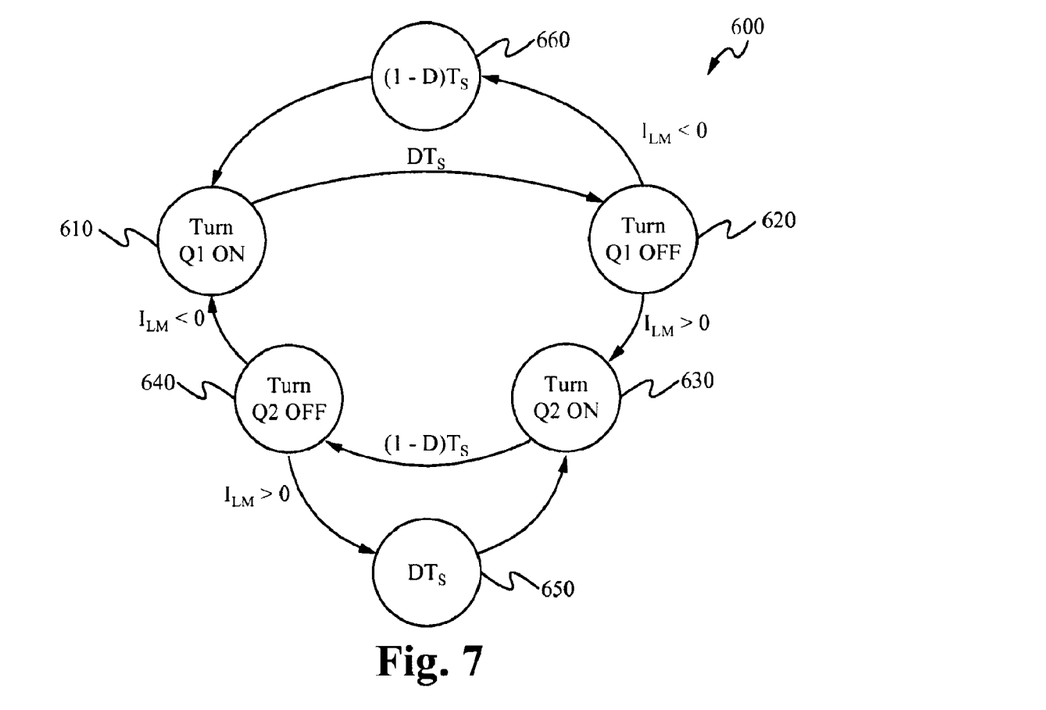

FIG. 7 shows a state diagram 600 for the controller 360 in accordance with one embodiment of the invention. Referring to FIGS. 4 and 7, in the state 610, Q1 310 is ON. After a time $DT_S$ has elapsed, the state 620 is entered. While in the state 620, if the magnetizing current $I_{LM}$ through the primary winding is positive, the state 630 is entered, but if $I_{LM}$ is negative, the state 660 is entered. In the state 660, after a time $(1-D)T_S$ has elapsed, the state 610 is entered.

In the state 630, after a time $(1-D)T_S$ has elapsed, the state 640 is entered, in which Q2 330 is turned OFF. While in the state 640, if the magnetizing current $I_{LM}$ is negative, the state 610 is entered, but if $I_{LM}$ is positive, the state 650 is entered. In the state 650, after a time $DT_S$ has elapsed, the state 630 is entered.

Figure 8:
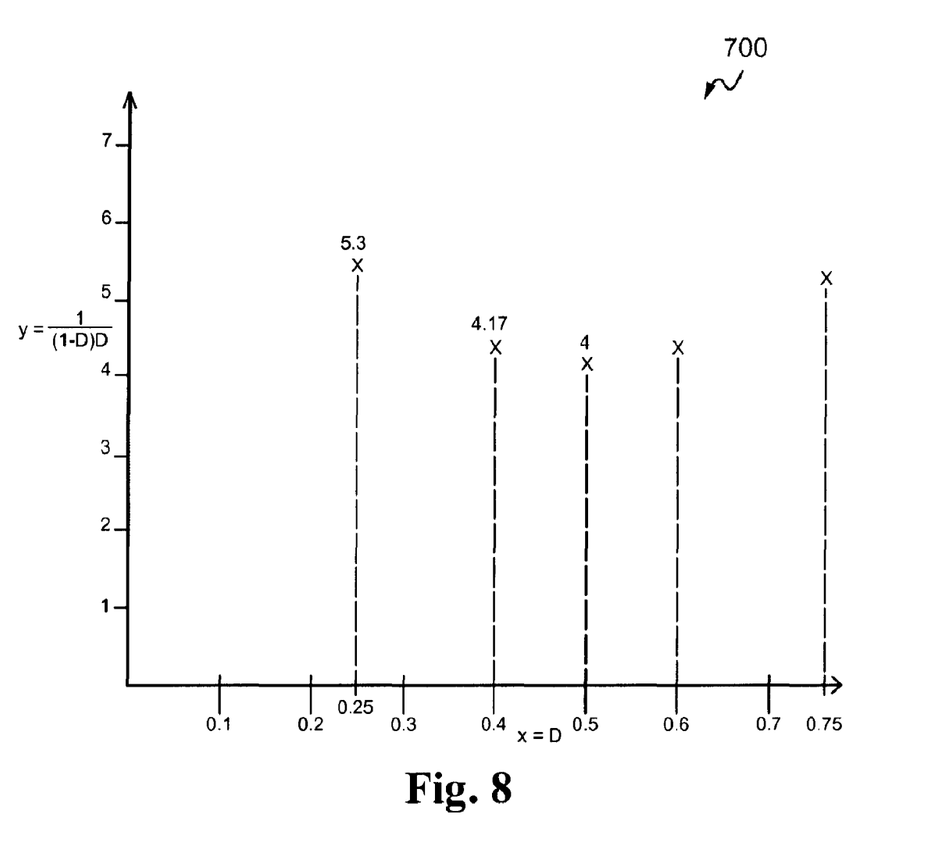
FIG. 8 shows a graph of a factor corresponding to the drain-to-source voltage of a power switch of a DC-to-DC converter versus duty cycle.

In accordance with one embodiment of the invention, a maximum duty cycle of a DC-to-DC power converter is clamped based on the voltage $V_{IN}$ input to the DC-to-DC power converter. The graph 700 in FIG. 8 illustrates the clamping, plotting the coefficient $1/(D(1-D))$ versus D, where D is the duty cycle of the DC-to-DC power converter. The graph 700 is parabolic, centered around D=0.5. The graph 700 is relatively constant for values relatively close to D=0.5 but increases dramatically as D approaches 0 and 1. In other words, clamping D to a suitable value will ensure that the drain-to-source voltage of a power switch does not exceed a predetermined threshold.

Referring again to FIG. 4, feed-forward maximum duty-cycle clamping detects changes in $V_{IN}$ and adjusts the maximum duty cycle accordingly to eliminate Node A's voltage dependence on $V_{IN}$. In general, a duty cycle headroom should be allowed for in a DC-to-DC converter such as the ones discussed above. In accordance with embodiments of the invention, in a transient condition such as a step in $V_{IN}$, a change in the load, or any other transient that can affect a DC-to-DC converter, the duty cycle changes to adjust to a new operating condition. Prior art solutions clamp a maximum duty cycle to a single value. For proper operation at a minimum $V_{IN}$, the maximum duty cycle clamp value must be higher than the maximum duty cycle. For example, a first maximum value $D_{M1}$ can be clamped at 10% above nominal D, a second maximum duty cycle value $D_{M2}$ at 20% above nominal, and a third maximum duty cycle value $D_{M3}$ at 30% above nominal. $V_{DS}$ is directly proportional to $D_{MX}$ where X is any headroom value. This prior art approach causes unnecessary duty cycle headroom, with $V_{DSMAX}$ directly proportional to $V_{IN}$. As a result, the main power switch suffers higher voltage stress, and a large flux imbalance is formed in the transformer during a transient condition. Flux imbalance may lead to flux saturation of the transformer and catastrophic failure as described above.

To prevent these problems, embodiments of the invention clamp the feed forward maximum duty cycle, meaning that $V_{IN}$ is taken into consideration when adjusting the duty cycle. As described below, this results in a $V_{DSMAX}$ that is no longer a direct function of $V_{IN}$.

Figure 9:
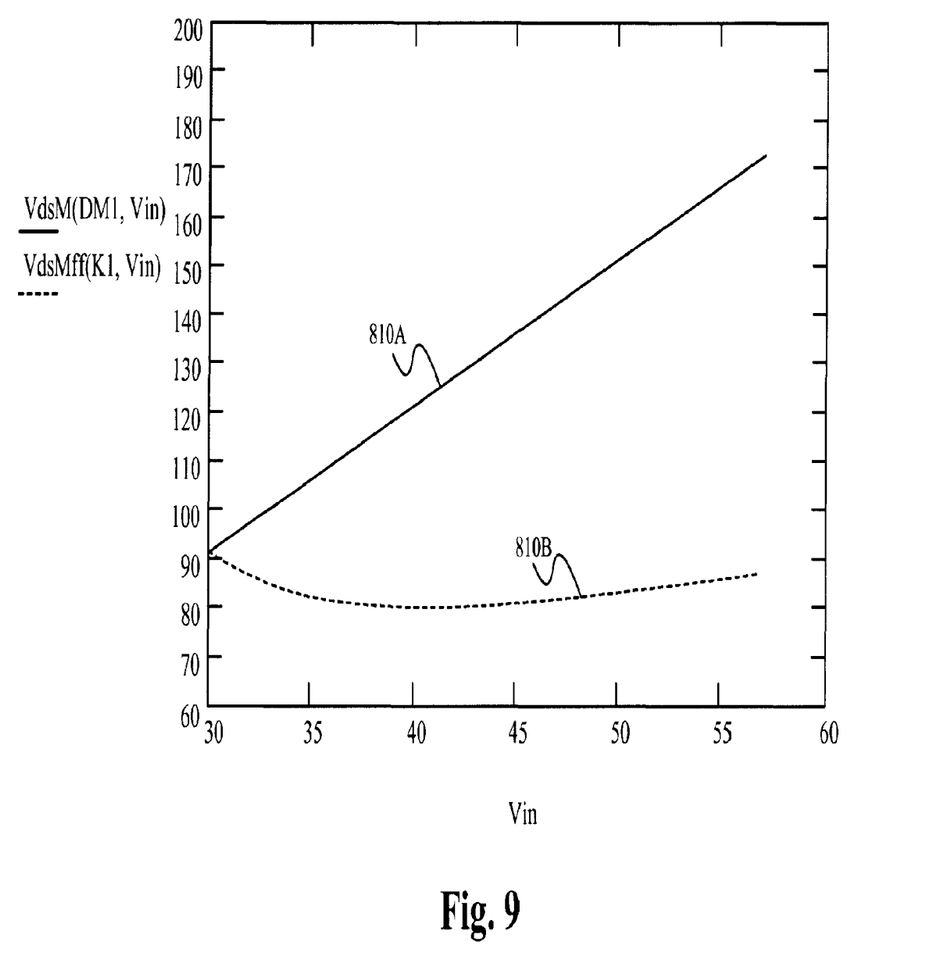
FIG. 9 shows two graphs of drain-to-source voltages for a power switch versus input voltages, the first graph for a DC-to-DC converter in the prior art, the second graph for a DC-to-DC converter in accordance with one embodiment of the invention.

FIG. 9 shows graphs 810A and 810B comparing $V_{IN}$ and $V_{DSMAX}$ using, respectively, a prior art solution and a solution in accordance with the invention, both assuming a 10% duty cycle headroom. This example assumes a range between 30V and 57V for $V_{IN}$, and 5V for $V_{OUT}$. A constant K is defined as $K=(N_P/N_S) V_{OUT}=18.33$. The steady state duty cycle is calculated as $D=K/V_{IN}$ and the steady state maximum duty cycle as $D_M=K/V_{INMAX}$ or 18.33/57=0.61. In the prior art method, $V_{DS}=V_{IN}/(1-D)$.

The graph 810A represents $V_{DS}$ vs. $V_{IN}$ for the prior art method. Since D=0.61, clamping $D_{MX}$ at 10% headroom gives a $D_{MX}$ of (0.61)(1.1) or $D_{MX}$=0.67. The maximum $V_{DS}$ is therefore 57/(1−0.67)=172V. For $V_{IN}$ in a range 30V-57V, the main power switch should be rated well above 170V. Such a power switch will be large, costly, and highly inefficient.

The graph 810B shows $V_{IN}$ vs. $V_{DS}$ in accordance with one embodiment of the invention. Using the feed forward methodology, $V_{DSMAX}=V_{IN}/(1-(K_Y/V_{IN}))$, where $K=(N_P/N_S) V_{OUT}$. Assuming a 10% headroom and $(N_P/N_S)=(11/3)$, $K_Y=(20.17)$, $V_{DSMAX}=57/(1-(20.17/57))=89V$, occurs at $V_{IN}=57V$. $V_{DSMAX}=30/(1-(20.17/30))=91.5V$, occurs at $V_{IN}=30V$. $V_{DS}$ stays relatively constant throughout the entire input range for 30V-57V, ranging from 91.5V to 80.7V. As a result, the maximum $V_{DS}$ rating on the main power switch can be nominally above 100V, accounting for manufacturing and safety tolerances. What results is a more efficient and cost effective DC-to-DC converter overall, having reduced cross conduction and a manageable reverse current and reduced danger of flux saturation within the transformer.

Figure 10:
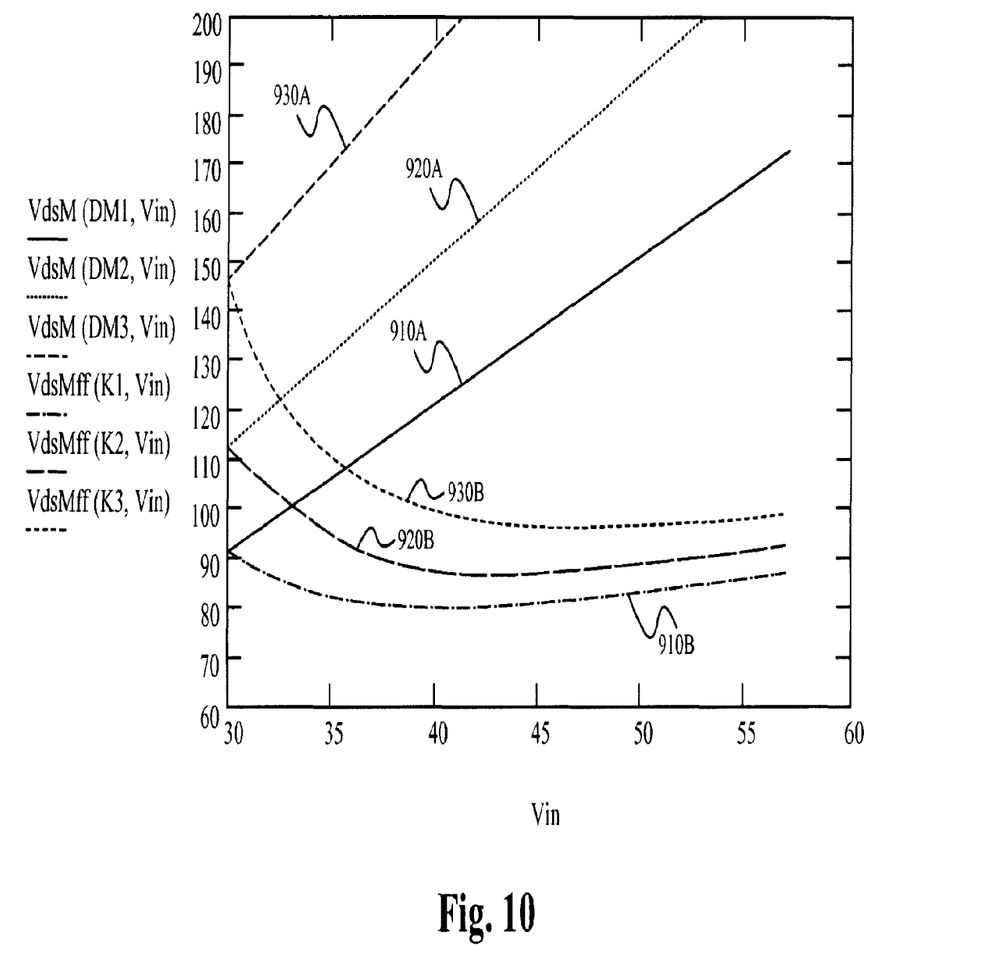
FIG. 10 shows graphs similar to those in FIG. 9, for different values of the constant K.

FIG. 10 shows three pairs of graphs 910A and 910B, 920A and 920B, and 930A and 930B, plotting various $V_{DS}$ versus $V_{IN}$ for 10%, 20%, and 30% duty cycle head room for the prior art method (910A, 920A, and 930A) and corresponding curves (910B, 920B, and 930B) for methods in accordance with embodiments of the invention.

Figure 11:
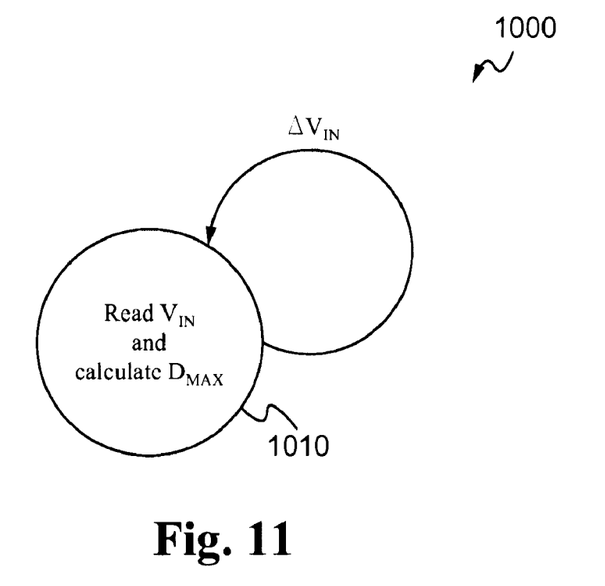
FIG. 11 shows a state machine diagram for a controller in a DC-to-DC converter in accordance with one embodiment of the invention.

FIG. 11 shows a state diagram 1000 for the controllers 360 and 460 of FIG. 4, to clamp the maximum duty cycle in accordance with one embodiment of the invention. In the state 1010, the controllers 360 and 460 read input voltage $V_{IN}$ and use it to calculate the maximum duty cycle, $D_{MAX}$. As one example, the maximum $K_Y$ constant is fixed as a percentage (e.g., 10%) over K. Other percentages can be chosen to fit the application at hand. If $V_{IN}$ changes, as shown by the transition labeled $\Delta V_{IN}$, the new $V_{IN}$ is used to update $D_{MAX}$.

The controllers 360 and 460 can be application specific integrated circuits (ASICs); computer-readable media containing computer-executable instructions for executing algorithms or state machines, such as those shown in FIGS. 6, 7, and 11, and a processor for executing the instructions; or any other means for performing algorithms or state machines, such as those described in this disclosure.

FIGS. 6, 7, and 11 show several examples of state machines for practicing embodiments of the invention. After reading this disclosure, those skilled in the art will recognize that the state machines can be modified in various ways, such as by adding additional states or modifying some of the states shown.

While different embodiments have been discussed separately, it will be appreciated that the features of the different embodiments can be combined in different ways. For example, one embodiment incorporates the features of reverse-current limit protection and maximum duty-cycle clamping as illustrated in FIGS. 6 and 11, respectively. Another embodiment incorporates the features of reverse-current limit protection and cross-induction prevention as illustrated in FIGS. 6 and 7, respectively. Still another embodiment incorporates the features illustrated in FIGS. 6, 7, and 11. Those skilled in the art will recognize other combinations of features to fit the application at hand.

Active-clamp controllers in accordance with embodiments of the invention are described in the document titled "Active-Clamped, Spread-Spectrum, Current-Mode PWM Controllers,"19-5331; Rev 1; 9/10, for the products "MAX5974A/MAX5974B/MAX5974C/MAX/5974D,"and available from Maxim Integrated Products, 120 Gabriel Drive, Sunnyvale, Calif. 94086, U.S.A. The document titled "Active-Clamped, Spread-Spectrum, Current-Mode PWM Controllers" is hereby incorporated by reference.

In operation, forward and reverse currents on a DC-to-DC converter are monitored. If either of the currents falls outside a pre-determined range, that current is automatically interrupted by changing a duty cycle of the DC-to-DC converter. If one of the currents flows in the "wrong" direction during a particular part of a switching cycle, that current is interrupted to prevent cross-conduction. The maximum duty cycle is also dynamically calculated to ensure that a voltage across a power switch is kept within acceptable limits.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details. It will be readily apparent to one skilled in the art that other modifications may be made to the embodiments without departing from the spirit and scope of the invention as defined by the appended claims.

I claim:

1. A DC-to-DC converter comprising:
   a transformer having a primary winding coupled to a forward current path and a reverse current path, wherein the forward current path is configured to source a forward current from a top of the primary winding to a bottom of the primary winding during a power phase of a switching cycle of the DC-to-DC converter, and wherein the reverse current path is configured to source a reverse current from the bottom of the primary winding to the top of the primary winding during a reset phase of the switching cycle;
   a sensing element configured to sense the forward and reverse currents; and
   a controller configured to control the forward and reverse currents based on sensed values thereof,
   wherein the controller is further configured to discontinue the forward current during a remainder of the power phase if the forward current is above a predetermined first threshold and to discontinue the reverse current during a remainder of the reset phase if the reverse current is below a predetermined second threshold.

2. The DC-to-DC converter of claim 1, further comprising a capacitor on the reverse current path, wherein the controller is further configured to charge the capacitor from the primary winding during the power phase and to discharge the capacitor to the primary winding during the reset phase, the capacitor having a value larger than an input voltage of the DC-to-DC converter.

3. The DC-to-DC converter of claim 1, further comprising a power switch on the forward current path for controlling the forward current and a reset switch on the reverse current path for controlling the reverse current, wherein the forward current path is parallel to the reverse current path.

4. The DC-to-DC converter of claim 3, wherein the controller is further configured to automatically turn OFF the power switch when the forward current is above the predetermined first threshold and to turn OFF the reset switch when the reverse current is below the predetermined second threshold.

5. The DC-to-DC converter of claim 3, wherein the controller is operable to control the power switch and the reset switch to automatically adjust a duty cycle of the DC-to-DC converter to maintain a voltage across the power switch within a predetermined range.

6. The DC-to-DC converter of claim 5, wherein a maximum of the duty cycle is based on an input voltage to the DC-to-DC converter.

7. The DC-to-DC converter of claim 3, wherein the controller is further configured to turn ON the power switch only if a magnetizing current through the primary winding is a reverse current, and to turn ON the reset switch only if the magnetizing current is a forward current.

8. The DC-to-DC converter of claim 1, wherein the sensing element comprises first and second sense resistors coupling the forward and reverse current paths, respectively, to a common potential, the controller further configured to monitor voltages or currents across the first and second sense resistors.

9. The DC-to-DC converter of claim 8, wherein the common potential is a ground.

10. A DC-to-DC converter comprising:
    a transformer having a primary winding coupled to a forward current path and a reverse current path, wherein the forward current path is configured to source a forward current from a top of the primary winding to a bottom of the primary winding during a power phase of a switching cycle of the DC-to-DC converter, and wherein the reverse current path is configured to source a reverse current from the bottom of the primary winding to the top of the primary winding during a reset phase of the switching cycle;
    a sensing element configured to sense the forward and reverse currents; and
    a controller configured to control the forward and reverse currents based on sensed values thereof,
    wherein the sensing element comprises a sense resistor coupling the forward and reverse current paths to a common potential, the controller further configured to monitor voltages or currents across the sense resistor.

11. The DC-to-DC converter of claim 10, wherein the common potential is a ground.

12. A method of controlling current flow in a DC-to-DC converter comprising a transformer with a primary winding, the method comprising:
    sensing positive currents, in a forward current path from a top of the primary winding to a bottom of the primary winding, and negative currents, in a reverse current path from the bottom of the primary winding to the top of the primary winding, wherein the forward current path includes a power switch; and automatically adjusting the positive and negative currents during a switching cycle of the DC-to-DC converter, wherein automatically adjusting the positive and negative currents comprises interrupting a positive current during a remainder of a power phase of the switching cycle if the positive current is above a predetermined positive threshold and interrupting a negative current during a remainder of a reset phase of the switching cycle if the negative current is below a predetermined negative threshold.

13. The method of claim 12, wherein the reverse current path comprises a reset switch, the method further comprising detecting a voltage across one or both of the power switch and the reset switch to determine a direction of a magnetizing current across the primary winding.

14. The method of claim 12, further comprising detecting a voltage across one or more sense resistors to determine a direction of a magnetizing current across the primary winding.

15. The method of claim 12, wherein adjusting the positive and negative currents maintains a maximum voltage across the power switch within a predetermined range.

16. The method of claim 15, wherein the predetermined range is below a maximum rating of the power switch.

17. The method of claim 15, wherein adjusting the positive and negative currents comprises adjusting duty cycles of the DC-to-DC converter.

18. The method of claim 17, wherein adjusting the duty cycles uses pulse width modulation.

19. The method of claim 12, wherein a voltage across the power switch is inversely proportional to a product of a duty cycle of the DC-to-DC converter (D) and (1−D).

20. The method of claim 12, the method further comprising conducting positive currents only if a magnetizing current on the primary winding is a negative current and conducting negative currents only if the magnetizing current is a positive current.

21. The method of claim 12, further comprising:
storing a charge on the reverse current path during the power phase; and
discharging the charge along the reverse current path during the reset phase to thereby reduce a magnetizing inductance on the primary winding.

22. A controller for monitoring and adjusting currents during a switching cycle of a DC-to-DC converter, the controller comprising:
a processor configured to execute a state machine having at least first, second, and third states, the first state corresponding to a first current having a positive polarity and a second current having a substantially zero value during a first phase of the switching cycle, the second state corresponding to the first current having a substantially zero value and the second current having a negative polarity during a second phase of the switching cycle, and the third state corresponding to the first and second currents having a substantially zero value during remainders of the switching cycle, wherein transitions between the first and second states are based on values and polarities of the first and second currents, the relative durations of the first and second states during the switching cycle defining a variable duty cycle.

23. The controller of claim 22, wherein a first transition from the first state to the third state is triggered when the first current exceeds a predetermined positive threshold and a second transition from the second state to the third state is triggered when the second current is below a predetermined negative threshold.

24. The controller of claim 22, wherein a transition from the first state to the third state is triggered when the second current has a negative polarity and a transition from the second state to the third state is triggered when the first current has a positive polarity.

25. The controller of claim 22, wherein the processor is configured to receive input signals corresponding to the first and second currents and to generate output signals for controlling the first and second currents according to the state machine.

26. The controller of claim 22, wherein the variable duty cycle is based on a third value corresponding to an input voltage to the DC-to-DC converter.

27. The controller of claim 26, wherein the state machine is configured to automatically adjust the duty cycle (D) to maintain a value $(1/(D*(1-D)))$ within a predetermined range.

28. The controller of claim 27, wherein the predetermined range is based on a predetermined drain-to-source voltage of a power switch for the DC-to-DC converter.

* * * * *

UNITED STATES PATENT AND TRADEMARK OFFICE
CERTIFICATE OF CORRECTION

PATENT NO. : 8,593,830 B2
APPLICATION NO. : 13/164689
DATED : November 26, 2013
INVENTOR(S) : Thong Anthony Huynh It is certified that error appears in the above-identified patent and that said Letters Patent is hereby corrected as shown below:

Title Page, Column 2

Other Publications, Line 22          Delete "Dalai" and insert --Dalal--

In the Specification:

Column 3, Line 8          Delete "100" and insert --105--
Column 3, Line 10         Delete "100" and insert --105--
Column 3, Line 21         Delete "100" and insert --105--
Column 3, Line 23         Delete "100" and insert --105--
Column 7, Line 9          Delete "Q1330" and insert --Q2 330--
Column 7, Line 21         Delete "Q2 320" and insert --Q2 330--
Column 9, Line 25         Delete "5974D,"and" and insert --5974D," and--

In the Claims:

Column 12, Line 42, Claim 27    Delete "(1/(D*(1-D))" and insert --(1/(D*(1-D)))--

Signed and Sealed this
Eleventh Day of November, 2014

Michelle K. Lee
*Deputy Director of the United States Patent and Trademark Office*